US005798708A

United States Patent [19]

Katayama

[11] Patent Number: 5,798,708

[45] Date of Patent: Aug. 25, 1998

[54] MESSAGE PROTECTION RADIO DISPLAY PAGING USING CONFIDENTIAL CODE AND PASSWORD

[75] Inventor: Hideyuki Katayama, Shizuoka, Japan

[73] Assignee: NEC Corporation, Tokyo, Japan

[21] Appl. No.: 662,366

[22] Filed: Jun. 12, 1996

[30] Foreign Application Priority Data

Jun. 13, 1995 [JP] Japan .................................. 7-146181

[51] Int. Cl.[6] .................................................. H04Q 7/18

[52] U.S. Cl. ............................... 340/825.44; 340/825.52; 340/825.51; 340/311.1; 370/312; 370/314; 380/23; 455/38.4

[58] Field of Search ......................... 340/825.44, 825.47, 340/825.52, 825.68, 825.69, 825.51, 311.1; 455/458, 426, 31.1, 31.2, 38.1, 38.2, 38.4; 370/310, 312, 313, 314; 380/23

[56] References Cited

U.S. PATENT DOCUMENTS

| | | | |
|---|---|---|---|
| 5,146,217 | 9/1992 | Holmes et al. | 340/825.44 |
| 5,247,519 | 9/1993 | Snowden et al. | 340/825.44 X |
| 5,283,832 | 2/1994 | Lockhart, Jr. et al. | 380/49 |
| 5,285,496 | 2/1994 | Frank et al. | 340/825.44 X |
| 5,483,595 | 1/1996 | Owen | 340/825.44 X |
| 5,550,535 | 8/1996 | Park | 340/825.44 |
| 5,638,450 | 6/1997 | Robson | 340/825.44 X |

FOREIGN PATENT DOCUMENTS

| | | |
|---|---|---|
| 63-169833 | 7/1988 | Japan . |
| WO9217006 | 10/1992 | WIPO . |

OTHER PUBLICATIONS

Patent Abstracts of Japan, vol. 12, No. 435 (E-683), Nov. 16, 1988.

*Primary Examiner*—Brian Zimmerman
*Assistant Examiner*—William H. Wilson, Jr.
*Attorney, Agent, or Firm*—Sughrue, Mion, Zinn, Macpeak & Seas, PLLC

[57] ABSTRACT

In a radio display paging system, a transmitted paging signal either contains an optional confidential code and a message if the message is confidential or exclusively a non-confidential message. When the paging signal is received by a destination pager, the message contained in it is stored in a message memory. If the received signal contains a confidential code, a prompt is displayed for urging a user to enter a password, and the message in memory is scrambled. If the entered password is valid, the message in memory is descrambled and displayed.

6 Claims, 2 Drawing Sheets

MESSAGE PROTECTION RADIO DISPLAY PAGING USING CONFIDENTIAL CODE AND PASSWORD

BACKGROUND OF THE INVENTION

1. Field of the Invention

The present invention relates generally to selective calling radio display pagers, and more specifically to a radio display pager for protecting confidential messages from unauthorized access.

2. Description of the Related Art

Japanese Laid-Open Patent Specification Sho-63-169833 discloses a radio display pager which shares a common address with other pagers for receiving non-confidential messages transmitted in a broadcast mode. To permit individual access, the prior art pager has a plurality of coding/decoding systems which are respectively identified by unique codes. One of the unique codes is used among the users of a particular group wishing to communicate group-specific messages. When sending such a message, the unique code is sent as part of the message field of a paging signal and the message is encoded according to a coding table specified by the unique code. The same unique code is set in the pagers of the same group. If a paging signal carrying the same unique code is received, the message contained in that signal is decoded according to a decoding table specified by the unique code and the decoded message is displayed.

However, if the pager of a given group is intentionally used by the members of other groups, information of confidential nature might be leaked to unauthorized members and an undesirable situation could occur.

SUMMARY OF THE INVENTION

It is therefore an object of the present invention to provide a selective calling radio display pager capable of protecting confidential messages from unauthorized access.

According to a first aspect of the present invention, a method is provided for exclusively displaying a confidential message to an authorized user as an optional feature of a selective calling radio display pager. A transmitted paging signal either contains an optional confidential code and a message if the message is confidential or exclusively a message if the message is not confidential. When a paging signal addressed to the pager is received, the message contained therein is stored in a message memory. If the received paging signal contains a confidential code, a prompt is displayed for urging a user to enter a password. If either the entered password is valid or the received paging signal contains no confidential code, the message in the message memory is displayed.

Preferably, the message in the message memory is scrambled if the received paging signal contains the confidential code, and the scrambled message is descrambled and displayed if the entered password is valid. The scrambled message may be displayed if the entered password is not valid.

According to a second aspect, the present invention provides a selective calling radio display pager for receiving a paging signal having a message field containing data which is either an optional confidential code plus a message if the message is confidential or exclusively a message if the message is not confidential. The pager comprises display means, a message memory, password input means, and control means. The control means stores data contained in the message field of a received paging signal into the message memory if the paging signal is addressed to the pager, displays a prompt on the display means for urging a user to enter a password from the password input means if the optional confidential code is contained in the data in the message memory, and displays the message in the memory on the display means if either the entered password is valid or the confidential code is not contained in the received paging signal.

Preferably, the pager further comprises a scrambler/descrambler. The control means causes the scrambler/descrambler to scramble the message in the message memory if the optional confidential code is contained in the data in the message memory, causes the scrambler/descrambler to descramble the scrambled message and displays the descrambled message on the display means if the entered password is valid.

BRIEF DESCRIPTION OF THE DRAWINGS

The present invention will be described in further detail with reference to the accompanying drawings, in which.

DETAILED DESCRIPTION

Figure 1:
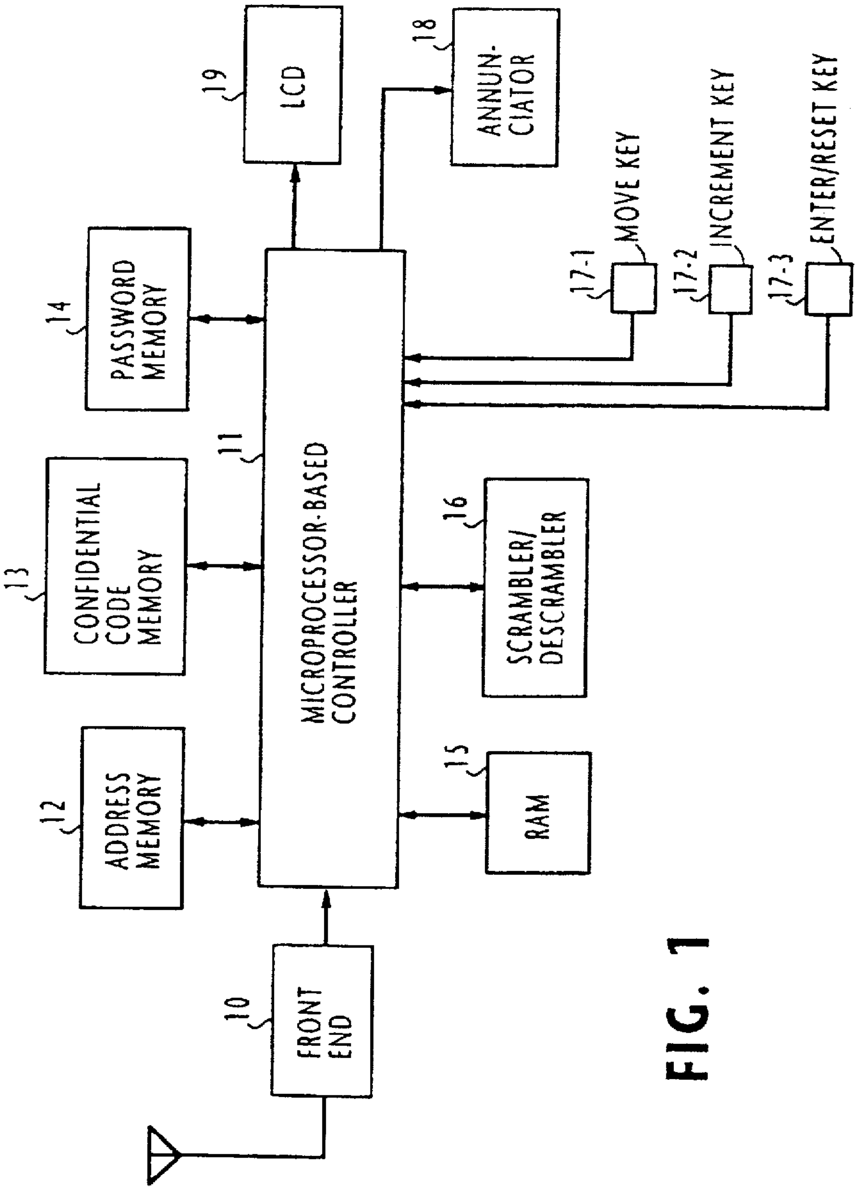
FIG. 1 is a block diagram of a radio display pager embodying the present invention.
Figure 2:
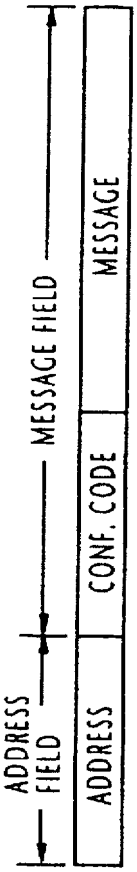
FIG. 2 is an illustration of the contents of a paging signal.

Referring to FIG. 1, a hand-held radio display pager embodying the present invention is illustrated as comprising a radio frequency section, or front end 10 for receiving a broadcast radio paging signal and converting it to a baseband signal. As shown in FIG. 2, the paging signal contains a preamble followed by a sequence of frames each containing a calling address in the address field, and an optional private confidential code and a message in the message field. If the message is of confidential nature, the message sender inserts a confidential code into a specified portion of the message field. The confidential code can be determined by an agreement among the members of a group sharing group-specific messages and sent as part of the message field as indicated in FIG. 2 when sending a confidential message. If the message is not confidential, no confidential code is inserted and the full area of the message field is used for the contents of the message. The received calling address is compared by a microprocessor-based controller 11 with the pager's address stored in an address memory 12. If they match, controller 11 stores the received message into a message memory, or random-access memory 15. An annunciator 18 is then activated to alert the user of the arrival of a message. For power savings purposes, battery saver circuitry, not shown, is provided in the hand-held pager.

Manually operated, "move", "increment" and "enter/reset" keys 17-1, 17-2 and 17-3 are provided. When the "enter/reset" key 17-3 is operated, controller 11 deactivates the annunciator 18 and reads out a message, if there is one, from RAM 15 for display on a liquid crystal display 19. In addition to address memory 12, a confidential code memory 13 and a password memory 14 are provided. Memories 12, 13 and 14 are implemented with respective storage locations of a nonvolatile memory such as EEPROM (electrically erasable programmable read-only memory).

The pager of this invention further includes a scrambler/descrambler 16. As described hereinbelow, the scrambler/ descrambler 16 is used for ciphering a received confidential message with a unique pseudorandom pulse sequence to protect the message from unauthorized users and deciphering it when a predetermined password is entered by an authorized user. For entering the password, the "move" key 17-1 is used to move the position of a blinking digit of N-digit numbers on the display 19 to the next and the "increment" key 17-2 is used to increment the value of the blinking digit until the desired number of the digit is reached. The "enter/reset" key 17-3 is depressed when the specified N-digit password is displayed.

Figure 3:
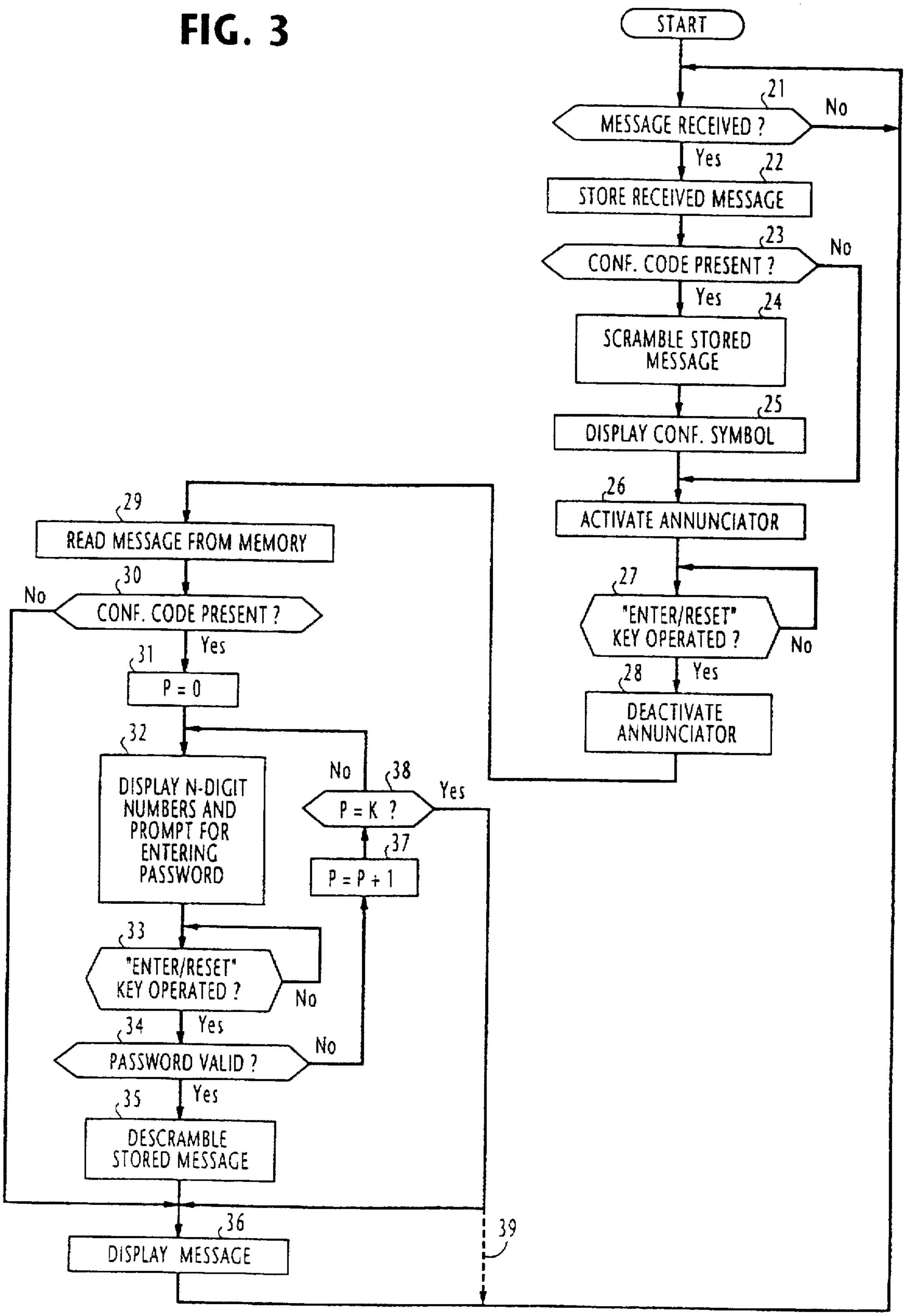
FIG. 3 is a flowchart of the operation of a microprocessor-based controller.

The operation of the controller 11, shown in the flowchart of FIG. 3, begins at step 21 where controller 11 checks to see if a message having the address matching the one in memory 12 is received. If so controller 11 proceeds to step 22 to store data contained in the message field of the paging signal into the message memory 15 and determines, at step 23, whether a prescribed portion of the data in the message field coincides with the confidential code stored in the confidential code memory 13. If they coincide, the message in the memory 15 is confidential and flow proceeds from step 23 to step 24 where the controller supplies the message to the scrambler/descrambler 16. Using a predetermined pseudorandom pulse sequence, the scrambler/descrambler 16 provides encryption of the stored message. At step 25, controller 11 displays a confidential symbol mark on the LCD 19 to indicate that the stored message is of a confidential nature. At step 26, the annunciator 18 is activated to alert the user of the arrival of a message. Flow proceeds to step 27 to determine whether the alerted user operated the key 17. If so, flow proceeds from step 27 to step 28 to deactivate the annunciator 18, and controller 11 reads the stored data from message memory 15 (step 29). If the prescribed portion of data in the message memory 15 does not coincide with the confidential code in the memory 13, it is determined that the message in the message memory 15 is not confidential and the decision at step 23 is negative. In that instance, flow proceeds from step 23 to step 26 to alert the user without scrambling the message.

Flow proceeds to step 30 to check to see if the prescribed portion of the stored data coincides with the confidential code stored in the confidential code memory 13 to determine if the stored message is confidential or not. If this is the case, the stored message is a scrambled version of the received message and flow proceeds to step 31 to set a count value P to zero. At step 32, N-digit numbers (initially all zeros) are displayed with the most significant digit position blinking to attract the user's attention and a prompt is also displayed for urging the user to enter a password. Using the "increment" key 17-2, the user increments the value of the blinking digit. When the desired value is reached for that position, the user moves the blinking position to the next by operating the "move" key 17-1 to repeat the same process. When all the digits of the displayed numbers are adjusted, the user depresses the "enter/reset" key 17-3.

Flow then proceeds to step 33 to check to see if the "enter/reset" key 17-3 is operated. If it is, flow proceeds from step 33 to step 34 to determine whether the entered password matches the one stored in the password memory 14. If they match, the entered password is valid, and the decision is affirmative at step 34. Flow proceeds from step 34 to step 35 where the controller directs the scrambler/descrambler 16 to descramble the encrypted message using the same pseudorandom sequence as that used in scrambling the message in the memory 15. The descrambled message is then displayed at step 36. Following the execution of step 36, flow returns to step 21.

If the entered password is not correct, the decision at step 34 is negative and flow branches to step 37 to increment the count value P by one and proceeds to step 38 to check to see if P is equal to a preselected number K. If not, controller 11 loops back to step 32 to allow the user to enter a password again.

If the user fails to enter the correct password K times, it is concluded that the user is not authorized to access the message and flow proceeds from step 38 to step 36 to display the message in the memory 15. Since step 35 is not executed, the message displayed is a scrambled one.

If no confidential code is contained in the received paging signal, the decision at step 30 is negative, and the stored message was not scrambled at step 23. In this case, flow proceeds from step 30 to step 36 to display the non-scrambled message.

While mention has been made of an embodiment where the scrambler/descrambler 16 is used, this unit as well as steps 23, 24 and 35 can be dispensed with if the controller 11 is modified so that flow proceeds from step 38 to step 21, as indicated by a dotted line 39 in FIG. 3, instead of proceeding to step 36, when the user repeatedly fails to enter the correct password K times.

What is claimed is:

1. A method for exclusively displaying a confidential message to an authorized user as an optional feature of a selective calling radio display pager, comprising the steps of:

a) transmitting a paging signal which contains an optional confidential code and a message if the message is confidential and contains exclusively a message if the message is not confidential;

b) receiving the paging signal if the paging signal is addressed to the pager and storing the message contained in the received paging signal in a message memory;

c) determining whether or not the received paging signal contains the optional confidential code;

d) if the received paging signal contains the optional confidential code, scrambling the message in the message memory and displaying a prompt for urging a user to enter a password, and if the entered password is valid, descrambling the scrambled message and displaying the descrambled message; and e) if the received paging signal does not contain the optional confidential code, displaying the message in said message memory.

2. A method as claimed in claim 1, wherein the step (d) further comprises the step of displaying the scrambled message if the entered password is not valid.

3. A selective calling radio display pager for receiving a paging signal having a message field containing data which is an optional confidential code plus a message if the message is confidential and which is exclusively a message if the message is not confidential, comprising:

display means;

a message memory;

password input means;

control means for storing the data contained in the message field of the received paging signal into said message memory if the paging signal is addressed to the pager, displaying a prompt on the display means for urging a user to enter a password via the password input means if the optional confidential code is contained in the data in the message memory, and displaying the message in the message memory on the display means if one of the entered password is valid and the optional confidential code is not contained in the received paging signal; and a scrambler/descrambler;

wherein the control means causes the scrambler/descrambler to scramble the message in the message memory if the optional confidential code is contained in the data in the message memory, and causes the scrambler/descrambler to descramble the scrambled message and display the descrambled message on the display means if the entered password is valid.

4. A selective calling radio display pager as claimed in claim 3, wherein the control means comprises:

an address memory for storing a pager's address;

a confidential code memory for storing a confidential code;

a password memory for storing a password; and a microprocessor-based controller for storing the data contained in the message field of the received paging signal into the message memory if there is a match between an address contained in the paging signal and the pager's address in the address memory, causing the scrambler/descrambler to scramble the message in the message memory and displaying said prompt on the display means if there is a match between a prescribed portion of the data in the message memory and the confidential code in the confidential code memory, causing the scrambler/descrambler to descramble the scrambled message and displaying the descrambled message on the display means if there is a match between the entered password and the password in the password memory, and displaying the message in the message memory on the display means if there is a mismatch between the prescribed portion of the data in the message memory and the confidential code in the confidential code memory.

5. A selective calling radio display pager as claimed in claim 4, wherein the microprocessor-based controller includes means for displaying the scrambled message on the display means if a mismatch repeatedly occurs between the entered password and the password in the password memory.

6. A selective calling radio display pager as claimed in claim 3, wherein said control means displays multiple-digit numbers on the display means, each of the multi-digit numbers being variable in response to manual commands entered from said password input means.

* * * * *